United States Patent [19]

White

[11] 3,719,052

[45] March 6, 1973

[54] VACUUM SYSTEM COLD TRAP

[76] Inventor: Gerald W. White, 5835 Elm Lawn, Dallas, Tex. 75228

[22] Filed: May 4, 1971

[21] Appl. No.: 140,135

[52] U.S. Cl. ....................62/3, 62/55.5

[51] Int. Cl. ....................B01d 5/00

[58] Field of Search ....................62/3, 55.5

[56] References Cited

UNITED STATES PATENTS

| | | | |
|---|---|---|---|
| 2,934,257 | 4/1960 | Power | 62/3 X |
| 3,010,285 | 11/1961 | Penn | 62/3 |
| 3,109,290 | 11/1963 | Kolenko | 62/3 |
| 3,137,551 | 6/1964 | Mark | 62/55.5 |
| 3,416,326 | 12/1968 | Stuffer | 62/55.5 |
| 3,423,947 | 1/1969 | Moriya | 62/3 |
| 3,464,223 | 9/1969 | Roberts | 62/55.5 |

*Primary Examiner*—William J. Wye
*Attorney*—H. Mathews Garland

[57] ABSTRACT

A cold trap for use in a vacuum system for minimizing migration of oil and other molecular particles therein. In each form of cold trap disclosed thermoelectric devices are used to produce cold surfaces on optically dense baffles for the condensation process. In particular, Peltier cells are connected with condensation plates within the vacuum space and with a heat sink for dissipation of heat energy removed from the cold condensation plates. The Peltier cells have cold junctions connected with the condensation plates and hot junctions connected with the heat sink. In one form of the device, the condensation plates are supported within the vacuum working space of a bell jar connected with an oil diffusion pump for producing a high vacuum in the bell jar by a conduit member defining a flow passage around the plates. A heat sink base on which the Peltier cells are mounted is connected with a heat dissipating base plate around the conduit between the bell jar and the oil diffusion pump. In another form of particle condensation apparatus, a baffle assembly connected with the cold junctions of Peltier cells is supported in a conduit between an oil diffusion pump and a space in which a vacuum is induced by the pump. The hot junctions of the cells are connected with a member cooled by a fluid, such as water or liquid nitrogen. A still further form of condensation apparatus or trap for use in a vacuum system includes plates cooled by Peltier cells and disposed within the pellet material of a molecular sieve form of cold trap.

7 Claims, 14 Drawing Figures

INVENTOR
Gerald W. White

BY H. Mathews Garland

ATTORNEY

INVENTOR
Gerald W. White

BY H. Mathews Garland

ATTORNEY

INVENTOR

Gerald W. White

BY H. Mathews Garland

ATTORNEY

INVENTOR
Gerald W. White

BY H. Mathews Garland
ATTORNEY

VACUUM SYSTEM COLD TRAP

This invention relates to devices for minimizing particle migration in vacuum systems and more specifically relates to cold traps for use with both mechanical and oil diffusion type pumps used for developing vacuums.

The principal types of apparatus employed in the past for reducing the movement of particles, such as water and oil vapor molecules in vacuum systems, have been cooled by use of liquid nitrogen and similar fluids which are circulated in a jacket surrounding and connected to baffles disposed in a conduit leading to a diffusion pump and/or mechanical roughing pump. The use of liquid nitrogen and similar cryogenic fluids is not only expensive but requires space to accommodate the storage vessels for the fluids, the lines leading from the vessels to the cold trap or traps, and related apparatus. The cryogenic fluids are, of course, consumable, and thus it is necessary that a constant fresh supply be available for continuing operations. As each cylinder being used is depleted, it is necessary that it be disconnected and a fresh cylinder be reconnected to the vacuum system. Other approaches to the reduction of molecular movement in vacuum systems includes the use of a molecular sieve type trap which includes a body of molecular sieve material, such as zeolite crystals, which may also have means for liquid nitrogen or other fluid cooling. It will be apparent that particularly with the systems using liquid nitrogen or other cryogenic fluids, any leak which might develop in the system causing loss of the fluid may interrupt expensive time-consuming experiments and other procedures necessitating the use of the fluid in the vacuum system by causing expensive shut-downs, possibly loss of samples being tested, and the like.

In accordance with the invention, there is provided a cold trap for use in minimizing migration of molecular particles in a vacuum system including baffles disposed within the paths of movement of the particles, thermoelectric apparatus having cold junction or junctions connected with the baffles, and heat absorption means connected with the hot junctions of the thermoelectric apparatus for removal of heat absorbed by the baffles and cold junctions.

In one form of the apparatus baffles are supported from a plate connected with the cold junctions of Peltier cells disposed over the opening into a vacuum working space of a bell jar from an oil diffusion pump so that oil molecules may not pass through the opening into the bell jar without striking the cold baffles. In another form of the invention, a baffle assembly is supported from the cold junctions of Peltier cells in a flow passage between an oil diffusion pump and working space in which a vacuum is imposed by the pump, with the hot junctions of the cells being connected with a cryogenic fluid-cooled annular jacket. In a still further form of the invention the roughing pump line of a vacuum system includes a molecular sieve-type trap having Peltier cell cooled plates disposed in the molecular sieve pellets with the hot junction of the cell coupled with a heat sink exposed to a flow of cooling fluid.

It is thus a particularly important object of the invention to provide a new and improved form of cold trap for use in a vacuum system which may include both mechanical roughing and oil diffusion pumps. It is another object of the invention to provide a new and improved cold trap which does not require the use of a cryogenic fluid for cooling condensing plates disposed in the line of movement of molecular particles within the vacuum system. It is still a further object of the invention to provide cold traps of the character described which include thermoelectric cooled condensing plates to remove molecular particles from the vacuum working space of a vacuum system.

These and further objects of the invention will be more clearly apparent from reading the following description of specific embodiments of the invention taken in conjunction with the accompanying drawings wherein.

Figure 1:
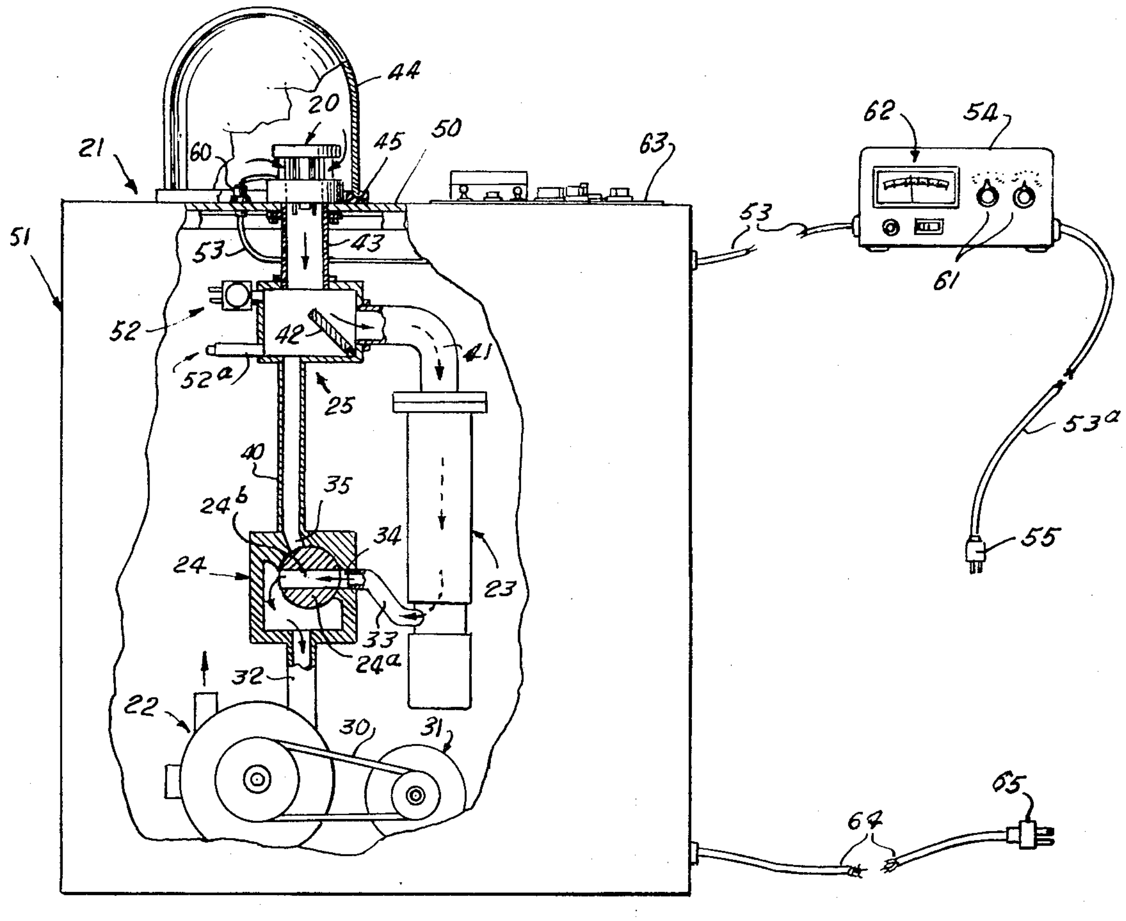
FIG. 1 is a schematic side view, partially broken away and partially in section, of a vacuum system having a roughing pump and an oil diffusion pump and including a cold trap embodying one form of the invention.
Figure 2:
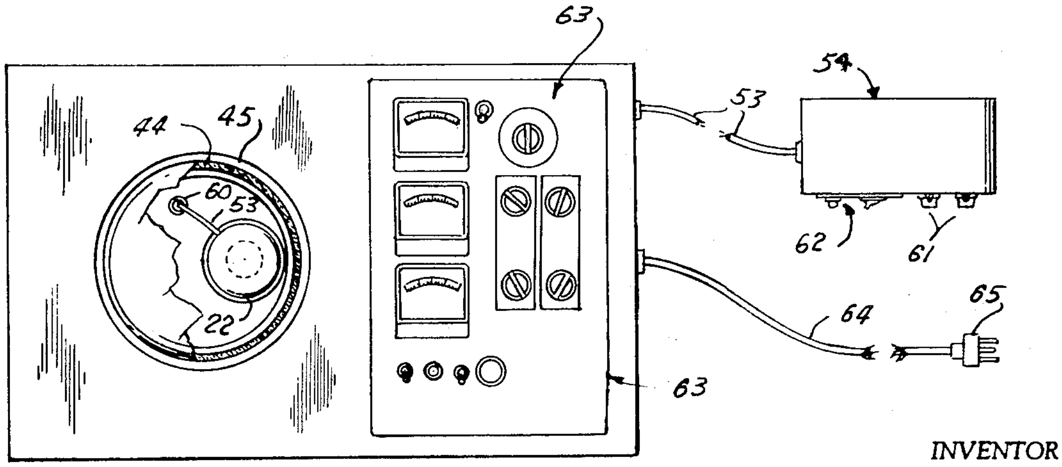
FIG. 2 is a top plan view partially broken away of the system of FIG. 1, particularly showing the positioning of the cold trap in the bell jar.

Referring to FIGS. 1 and 2 of the drawings, a cold trap 20 is shown in a vacuum system 21 for minimizing back streaming of molecular particles into the working area of the vacuum space conditioned by the system 21. The vacuum system includes a mechanical roughing pump 22, an oil diffusion pump 23 of suitable standard design, a roughing backing valve 24, and a high vacuum valve 25. The roughing pump is driven by a belt 30 connected with a motor 31. The intake line 32 of the pump 22 is connected with the outlet side of the valve 24. The outlet 33 of the oil diffusion pump is connected with one inlet 34 of the roughing valve. The other inlet 35 of the roughing valve is connected by a line 40 to the high vacuum valve 25. An inlet line or high vacuum line 41 is connected from the inlet of the diffusion pump 23 to the outlet of the high vacuum valve 25. A valve member 42 within the high vacuum valve controls communication from the valve into the line 41 to the oil diffusion pump. A vacuum pumping line 43 leads from the inlet of the high vacuum valve 25 into the base of a bell jar 44 supported on a base member 45 resting on a top panel 50 of a suitable housing 51 enclosing the vacuum system. Control and gauge fittings 52 and 52*a*, respectively, are connected with the high vacuum valve 25. An insulated two wire conductor 53 leads from the cold trap to a gauge and control unit 54 to the cold trap to energize and control the thermoelectric devices of the trap. The control unit 54 is connected by another power line 53*a* to a male plug or fitting 55 for connection into a power source, not shown. The conductor 53 is secured through a leak-proof fitting 60 in the panel 50 within the bell jar. The control unit 55 has suitable switches 61 and a gauge 62 for controlling and monitoring the thermoelectric devices of the cold trap. The vacuum system is manipulated by a control panel 63 connected with a suitable source of power, not shown, through a power conductor 64 having a male connector 65. The panel 63 has suitable switches and gauges for controlling and monitoring the mechanical and diffusion pumps and related apparatus to properly operate the vacuum system.

Generally speaking, the roughing pump 22 acting through the valve 24 initially reduces the pressure in the vacuum system to a predetermined first vacuum level, with the diffusion pump 23 then being actuated to further reduce the pressure to a desired high vacuum level. During the initial operation of the roughing pump, the valve member 42 in the high vacuum valve 25 is closed, shutting off communication with the high vacuum line 41, and the valve member 24*a* of the roughing valve 24 is moved to a position at which its flow passage 24*b* is in communication with the line 40 while the line 33 to the oil diffusion pump is closed off. At these valve positions the roughing pump pulls directly through the line 32, the valve 24, and the line 40, the valve 25 and the pumping line 43 to reduce the pressure in the bell jar. At a suitable predetermined reduced pressure the roughing valve is turned to the position shown in FIG. 1, normally referred to as the "-back" position, and the valve member 42 is opened so that the diffusion pump pulls through the high vacuum line 41, the valve 25, and the pumping line 43 to further reduce the pressure within the bell jar. The efforts of the diffusion pump are enhanced by the roughing pump which operates in series with the diffusion pump. Since the principle of operation of the oil diffusion pump involves molecular size particles of oil, the movement of such particles in the system includes the possibility of back streaming of the particles into the vacuum space within the bell jar such that the procedures being carried out in the bell jar might be impaired by the oil particles. For example, if tissue to be studied, such as pathological samples, are being freeze-dried in the vacuum jar, contamination of the tissue samples is possible by the particles of oil. Hence, the cold trap 20, in accordance with the invention, serves as a barrier to preclude the movement of the oil particles into the vacuum working space of the bell jar.

The cold trap 20 is shown in detail in the FIGS. 3–7 of the drawings. The cold trap has a heat sink base 70 in the form of a somewhat massive annular metal ring of good heat conductive properties which rests within the bell jar on the panel 50 supporting the bell jar base. The vacuum pumping line 43 from the high vacuum valve 45 is connected through the base 50 and secured by a retainer ring 71 held by bolts 72 threaded into the underside of the plate 50. An annular gasket 73 seals the connection of the line 43 into the base 50 to prevent loss of vacuum through the connection. The base 70 is positioned over the line 43 with the bore 70*a* aligned with the bore 43*a* of the line.

Figures 3, 4, 5, 6, 7:
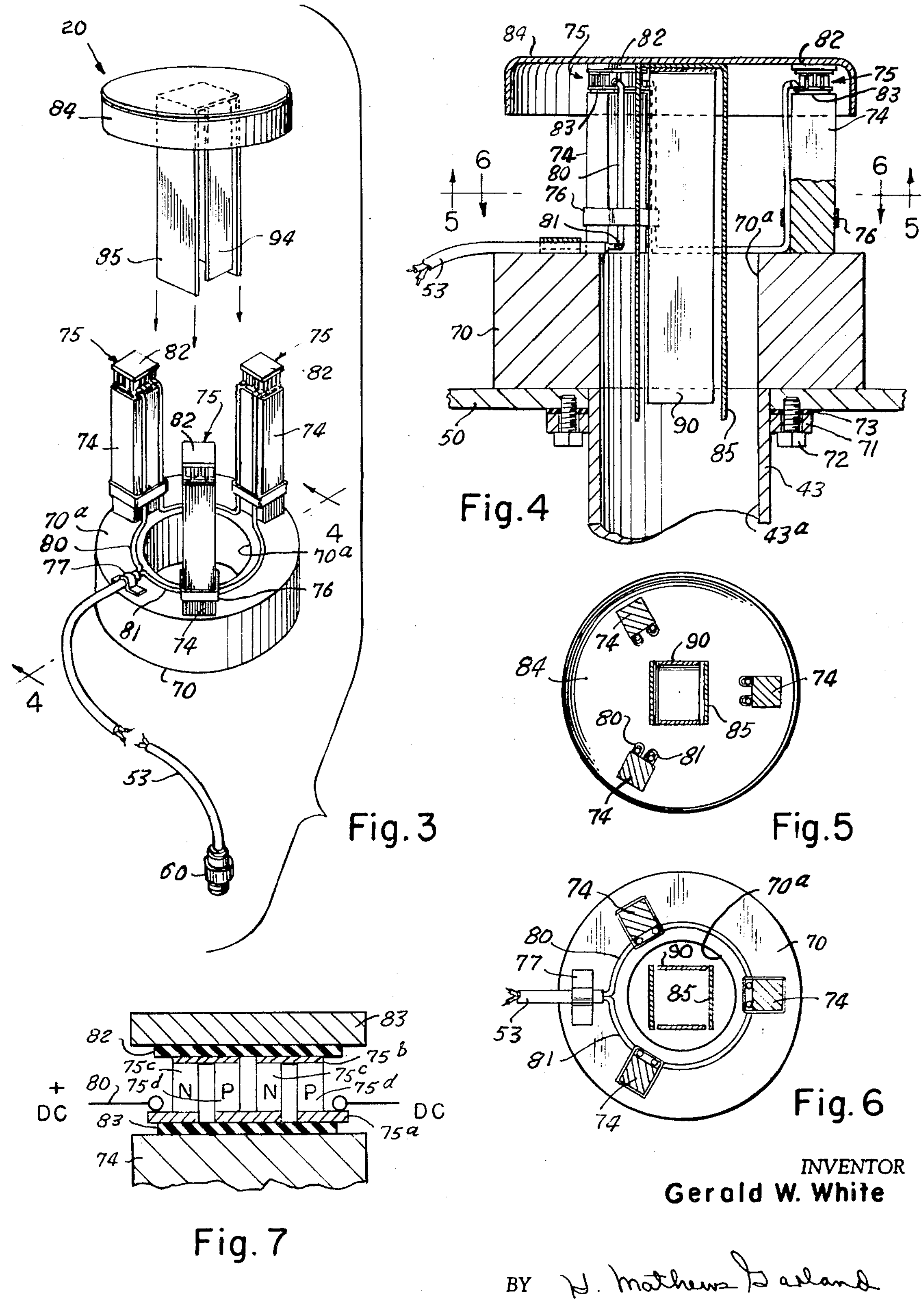
FIG. 3 is an enlarged exploded perspective view of the cold trap used in the system of FIGS. 1 and 2.
FIG. 4 is a further enlarged side view in section and elevation of the cold trap of FIG. 3.
FIG. 5 is a view in section along the line 5—5 of FIG. 4.
FIG. 6 is a view in section along the line 6—6 of FIG. 4.
FIG. 7 is a diagrammatic fragmentary view in section showing one of the thermoelectric devices used in the cold trap of FIGS. 3–6.

A plurality of vertical columns 74 are mounted at their lower ends on and spaced around the top face 70*a* of the heat sink base 70. The columns 74 are formed of a heat absorbing and conductive material similar to that forming the heat sink base 70. A thermoelectric device 75 is mounted on the top end of each of the columns 74. The thermoelectric devices are of the type generally known as a Peltier cell which are commercially available units adaptable to both cooling and heating functions by electronic particle movement. Referring to FIG. 7, each of the devices 75 has a hot junction 75*a* and a cold junction 75*b* interconnected by N and P type semiconductors 75*c* and 75*d*, respectively. The cell is connected with a suitable source of direct current through leads 80 and 81 which interconnect the several cells of the cold trap in series and extend in the conductor 53 through the coupling 60. The leads to the cells are held along the inner faces of the columns 74 by straps 76 and to the base 70 by a bracket 77. Each of the cells 75 has upper and lower heat conducting electrical insulation material 82 and 83 for transmitting heat from the cell while insulating it electrically. A cold junction plate 83 is mounted on top of each of the cells 75 and supports a cap 84 from which are suspended a pair of condensation fins 85 and 90 which are substantially U-shaped and secured together along their bights with the underside of the cap 84 supporting the legs in downwardly extending or dependent positions through the heat sink base 70 extending slightly into the pumping line 43. The fins 85 and 90 and the cap 84 are all formed of an efficient, heat conductive material cooled by the cold junctions of the thermoelectric cells 75 when the cells are energized by current flow in a direction to establish the bases of the cells as hot junctions and the top plates of the cells as cold junctions. The disposition of the cap 84 and the fins 85 and 90 over the opening into the bell jar from the pumping line 43 provides structure which is optically dense to the straight line movement of molecular particles so that pumping may occur for reducing the pressure within the bell jar while the oil particles strike the fins 85 and 90 and/or the cap 84 condensing the particles on the cooled surfaces. By so positioning the cooled surfaces any oil particles from the diffusion pump which would back stream into the bell jar through the line 43 must contact either the fins 85 and 90 or the cap 84. Due to the substantially reduced temperature of the surfaces of these members, the particles condense on and are collected by the members preventing contamination of the vacuum working space within the bell jar.

When operation of the vacuum system 21 including the trap 20 is desired, the system is started up with the valve member 42 closed and the valve member 24*a* of the roughing valve 24 at a position communicating the valve with the line 40. The mechanical pump 22 is first started to draw down the pressure through the line 40, the valve 25, and the line 43 in the bell jar to initiate the reduction of pressure in the bell jar. The roughing pump alone may be operated, for example, four or five minutes, after which the roughing valve member 24*a* is turned to the position shown in FIG. 1; the high vacuum valve 25 is opened by shifting the valve member 42 to the position shown in FIG. 1; and the oil diffusion pump is turned on. This places both the roughing pump and the oil diffusion pump in operation in series so that the roughing pump is pulling downstream of the oil diffusion pump. To preclude movement of unwanted molecular particles of oil and other vapor, such as water vapor, into the vacuum working space of the bell jar, the trap 20 in energized by connecting the control and monitoring unit 55 to a suitable source of power to supply direct current electrical energy to the cold trap. Energizing the thermoelectric cells 75 effects electron particle flow which moves heat energy from the upper cold junctions of the cells to the lower hot junctions. This cooling of the cold junctions effects cooling of the cap 84 and the fins 85 and 90 supported from the cap. The heat absorbed at the cold junctions is electronically pumped to the hot junctions at a rate proportional to the carrier current passing through the circuit and the number of electrical couples involved. The heat moved to the hot junctions is absorbed and dissipated down the columns 74 which transmit the heat to the heat sink base 70 which in turn dissipates the heat through the panel 50 on which the heat sink 70 is supported. Thus, the heat is moved to members which have large areas to readily dissipate the quantity of heat involved in the transfer. The resulting cooling of the fins 85 and 90 and the cap 84 very effectively provides cold surfaces on which the oil particles condense to keep the bell jar free of such contaminating oil. Also, the removal of oil and water vapor from the system decreases the ultimate pressure obtainable in the system.

When the procedures performed in the bell jar are completed, the cold trap may be regenerated by reversing the direction of current through the cells 75, thereby moving the electrons in the cells in the opposite direction so that the junctions 75*b* heat the cap 84 and the fins 85 and 90 to evaporate the oil and other moisture particles on the members to clean the surfaces of the members. Thus, the cold trap 20 is operated both for condensation and for regeneration purposes without the necessity of the use of cryogenic fluids, requiring only a source of electrical current to effectively maintain a contamination-free vacuum working space within the bell jar.

Figures 8, 9, 10, 11:
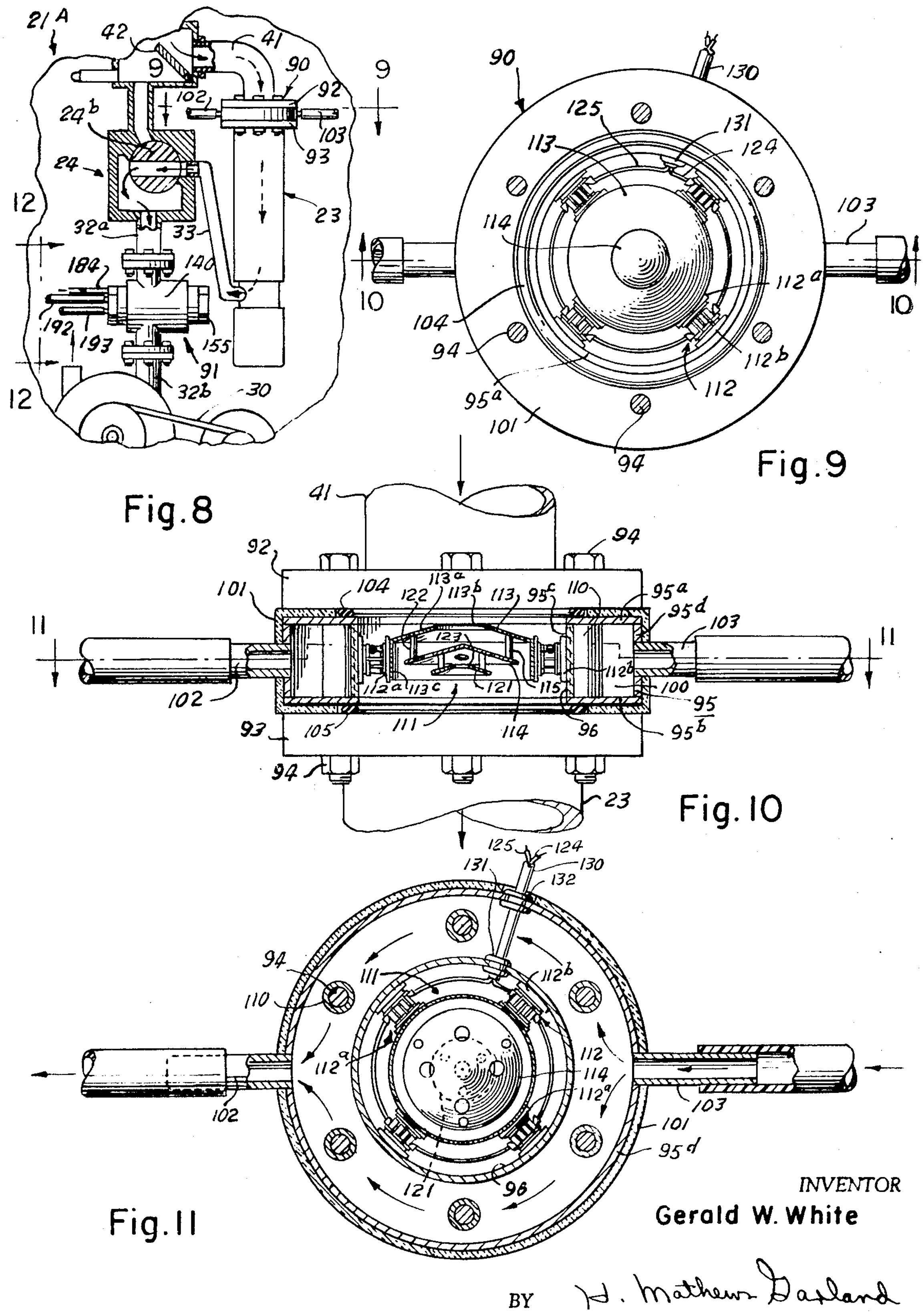
FIG. 8 is a fragmentary view, partially in section and partially in elevation, of a modified form of the vacuum system shown in FIG. 1 utilizing cold traps embodying the invention in both the roughing pump and the diffusion pump lines.
FIG. 9 is an enlarged view in section of the diffusion pump cold trap taken along the line 9—9 of FIG. 8.
FIG. 10 is a side view in section and elevation along the line 10—10 of FIG. 9.
FIG. 11 is a view in section along the line 11—11 of FIG. 10.

Referring to FIG. 8, another form of vacuum system 21A includes a cold trap 90 secured between the high vacuum line 41 and the oil diffusion pump 23 and also a molecular sieve type cold trap 91 connected in the roughing line 32 between the roughing valve 24 and the roughing pump 22. In all other respects the vacuum system 21A is substantially identical to the system 21. The cold traps 90 and 91 serve to trap molecular particles in both the high vacuum line and the roughing pump line leading to the vacuum working space within the bell jar, or such other working space as may be served by the vacuum system.

The cold trap 90 is secured between upper and lower housing flanges 92 and 93 by a plurality of circumferentially spaced bolts 94. The flange members 92 and 93 are annular members connected with adjacent ends of the high vacuum line 41 and the housing of the diffusion pump 23, respectively. The cold trap includes a hollow annular housing 95 formed by upper and lower annular plates 95*a* and 95*b*, an inner cylinder 95*c*, and an outer cylinder 95*d*, thereby providing a hollow annular chamber 100. The housing 95 is clamped between the flanges 92 and 93 within an annular inwardly opening channel-shaped insulator 101 to provide heat insulation to the cooled housing during operation of the trap. A pair of fluid flow lines 102 and 103, both of which are insulated, are connected into the chamber 100 through the insulation 101 and the outer wall 95*d* of the housing 95 at opposite sides of the housing as evident in FIGS. 9 and 10 for flow of a cooling fluid, such as a cryogenic fluid, water, or the like through the housing chamber. Upper and lower ring seals 104 and 105 are secured between the housing 95 and the upper and lower flanges 92 and 93 for sealing against vacuum loss between the flange connections with the cold trap housing. Each of the bolts 94 passes through a sleeve 110 secured between the upper and lower plates 95*a* and 95*b* of the housing 95. Each sleeve 110 provides a leakproof conduit for extending the bolts through the housing for securing the housing in the high vacuum line between the flanges 92 and 93. The sleeves 110 as shown in FIG. 11 are symmetrically disposed circumferentially spaced around the housing structure.

A baffle assembly 111 is supported within the flow passage 96 defined through the cold trap by the inner housing wall 95*c*. The baffle assembly is supported from a plurality of circumferentially spaced thermoelectric cells 112, each of which is secured around the inner face of the inner wall 95*c* of the housing 95. The baffle assembly includes an outer and upper baffle 113 which has an upper conical shaped portion 113*a* having a central opening 113*b* and an integral outer cylindrical wall portion 113*c*. The cold junctions 112*a* of the thermoelectric cells are secured with the outer surface of the baffle portion 113*c* for supporting the baffle assembly from the cells. A middle conical shaped baffle 114 is suspended below the baffle 113 on circumferentially spaced support rods 115 secured at their upper ends to the lower face of the conical portion 113*a* of the baffle 113. The conical baffle 114 has a plurality of circumferentially spaced openings 120. The diameter of the baffle 114 is substantially less than the diameter of the baffle 113 so that flow may occur around the outer periphery of the baffle within the outer baffle wall 113*c* in addition to flow through the openings 120. Another lower, smaller baffle 121 is supported below and from the baffle 114 by circumferentially spaced rods 122. The baffle 121 is conical in shape and has a central opening 123 at the apex of the baffle. The shape, size, and positioning of the baffles 113, 114, and 121 and the opening through the baffles provides an optically dense baffle assembly through which adequate flow may be induced for reducing the pressure in the vacuum system by means of the dispersion pump 23 while at the same time the optical denseness of the baffle assembly precludes the straight line movement of molecular particles without striking the surface of at least one of the baffles.

The hot junctions 112*b* of the thermoelectric cells are connected with and electrically insulated from the inner face of the housing wall 75*c* for dissipation of heat pumped electronically from the cold junctions to the hot junctions of the cells. The cells are connected in series with a pair of leads 124 and 125 disposed through insulation 130 secured through seal rings or grommets 131 and 132 for leakfree connection into the bore 96 through the housing 95. The leads 124 and 125 conduct electrical energy to the thermoelectric cells to activate the cells for cooling the baffles of the baffle assembly 111. Since the hot junctions 112*b* of the thermoelectric cells are connected with the inner housing wall 95*c*, the heat energy pumped to the hot junctions is dissipated through the housing wall. The heat energy may be more rapidly absorbed and removed from the cold trap by flow of fluid which may range from chilled water to cryogenic fluids pumped through the annular chamber 100 of the housing by means of the lines 102 and 103. It will be recognized that the trap will, however, function without the use of auxiliary cooling fluid.

When the vacuum system 21A is in operation, the baffle assembly 111 is cooled by energizing the cells 112 by applying current to the cells through leads 124 and 125 from a suitable power source, not shown. The electronic activity in the cells cools the cold junctions 112*a* of the cells which cools the baffle assembly 111, pumping the heat energy from the baffle assembly to the hot junctions 112*b* of the cells. The chilled baffles 113, 114, and 121 of the baffle assembly trap the particles, such as oil particles, from the oil diffusion pump 23 preventing backstreaming of the particles through the high vacuum line 41 into the working space in the bell jar. Flow from the working space through the high vacuum line and into the oil dispersion pump readily occurs around and through the baffle assembly while the optical density of the assembly permits it to capture the molecular particles which desirably are kept out of the vacuum working space of the bell jar. The heat energy pumped by the cells to their hot junctions is transferred to the housing wall 95*c* to absorbing fluid, such as cryogenic fluid or water pumped through the annular chamber 100 of the housing in the lines 102 and 103. When the system is shut down and regeneration of the cold trap is desired to clear the baffle plates of the oil particles condensed thereon, the direction of the current flow through the leads 124 and 125 is reversed, thereby reversing the character of the hot and cold junctions so that the baffle plates are heated to vaporize the oil and other molecular particles from the baffle surfaces.

Figures 12, 13, 14:
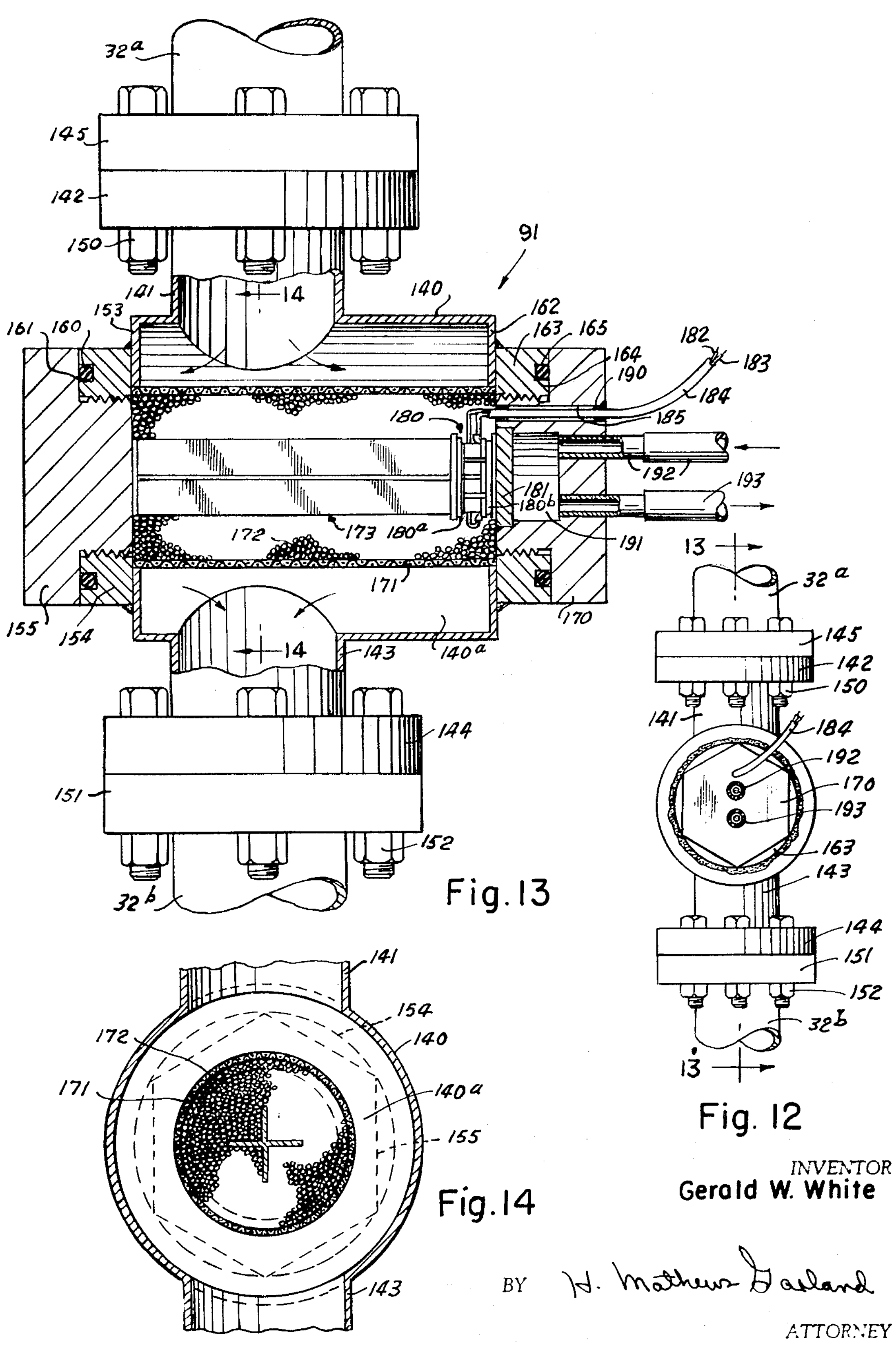
FIG. 12 is an enlarged end view of the cold trap in the roughing pump line as viewed along the line 12—12 of FIG. 8.
FIG. 13 is an enlarged side view in section and elevation of the roughing pump cold trap as viewed along the line 13—13 of FIG. 12.
FIG. 14 is a view in section along the line 14—14 of FIG. 13 showing the disposition of the condensation fins in the molecular sieve pellets of the cold trap.

The roughing pump trap 91 is shown in detail in FIGS. 12–14. The trap 91 has a cylindrical housing 140 to which is secured an upper connector 141 having a flange 142, and a lower connector 143 provided with a flange 144. The upper flange 142 is connected with a flange 145 provided on an upper section 132*a* of the roughing pump line. The flanges 142 and 145 are connected by bolt assemblies 150 for coupling the upper end of the cold trap into the upper roughing pump line section 32*a*. Similarly, the lower roughing pump line section 32*b* has a flange 151 connected with a flange 144 by bolt assemblies 152 for securing the lower end of the trap to the roughing pump line portion 32*b* which, as seen in FIG. 8, leads directly into the roughing pump. The housing 140 has one annular end plate flange 153 to which is suitably secured, as by welding, an internally threaded nipple 154. A threaded closure cap 155 is secured in the nipple 154 and is removable for servicing the trap. A ring seal 160 in a recess 161 of the nipple 154 seals between the nipple and the cap 155. At the opposite end of the cold trap the housing 140 has an annular flange plate 162 to which also is suitably secured an internally threaded nipple 163 which has an endwardly opening recess 164 for a ring seal 165 to seal with another closure cap 170 threaded into the nipple.

A porous cylinder 171 formed of a material such as screen wire or a suitable mesh is secured concentrically the full length of the housing 140 between the end flanges 153 and 162 for supporting a body of molecular sieve pellets 172 which may be a material such as zeolite crystals. A cross-shaped baffle assembly 173 comprising a vertical elongated baffle 174 and a horizontal baffle 175 is supported along the axis of the cylinder 171 substantially the full length of the cold trap housing from a thermoelectric cell 180 secured to one end of the baffles. The molecular sieve pellets 172 fill the cylinder 171 around the baffles 175 and 174 and the cell 180, as particularly evident in FIG. 14. The baffle assembly is secured with the cold junction 180*a* of the cell 180. The hot junction 180*b* of the thermoelectric cell is secured on the inner face of a plate 181 in the closure cap 170 for dissipation of heat electronically pumped from the cold to the hot junction of the cell. The cell is connected with leads 182 and 183 extending in sealed relationship through the closure cap 170 to a suitable source of power, not shown. The leads are disposed in insulation 184 through a bore 185 in the closure cap and sealed by gaskets 190 secured at opposite ends of the bore around the insulated leads. The closure cap 170 has an inner chamber 191 which communicates with a pair of insulated flow lines 192 and 193 connected through the closure cap into the chamber for the flow of a cooling fluid which may be chilled water, a cryogenic fluid, or the like from a suitable source, not shown. Fluid flow through the chamber 191 is for the removal of heat from the hot junction of the thermoelectric cell dissipated through the plate 181.

The molecular sieve pellets and the baffle assembly 173 provide an optically dense trap in the roughing pump line to minimize the backstreaming of oil and water particles and the like of molecular size from the pump toward the space, such as in the bell jar, being maintained under vacuum by the system 21A. When the cell 180 is energized by power through the leads 182 and 183, heat is pumped from the cold junction 180*a* to the hot junction 180*b*, thereby cooling the cold junction 180*a* and the baffle assembly 173 connected to the junction. The cooling effect of the baffle assembly is transmitted to the molecular sieve pellets 172, thereby cooling the entire body of the molecular sieve. Back streaming molecular-size particles of oil, water, and the like are condensed on the pellets and the baffle plates to minimize the movement of such particles upwardly through the roughing line to and into the working vacuum space of the system, such as in the bell jar. The heat absorbed by the pellets and the baffle assembly by virtue of the cooling of the cold junction **180*a* is electronically pumped to the hot junction 180*b* where the heat is dissipated through the plate 181 which is in contact with a flowing cooling fluid passing through the chamber 191 of the trap in the lines 192 and 193 so that the heat is carried off from the trap. When regeneration of the molecular sieve trap is desired, the current flow is reversed to the thermoelectric cell 180 so that the junction 180*a* is heated to raise the temperature of the baffle assembly 173 and the molecular sieve pellets to a sufficient level to vaporize the particles which have condensed on the sieve pellets and baffle surfaces so that the trap is cleaned for reuse. While the housing 140 is sufficiently larger than the pellet supporting cylinder 171 that an annular space 140*a* is provided within the housing all the way around the sieve, particles desired to be trapped are captured by the sieve and baffle due to the straight line movement of the particles. It will be recognized from FIG. 14 that while flow may occur between the upper and lower members 141 through the annular space 140*a* around the cooled molecular sieve, straight-line movement of molecular particles between the members past the sieve is impossible, and thus optical density is provided so that all molecular particles which tend to back stream in the roughing pump line must strike the cooled sieve pellets and/or the baffle plates. The caps 155 and 170 are readily removed for replacement of the molecular sieve pellets and for any servicing which may be required of the thermoelectric cell 180** and the related structural parts.

It will be recognized that the operation of the vacuum system 21A is identical to that of the system 21 and thus the details of operation, including the sequence of steps involved and the like, are discussed in connection with the description of the system 21.

The use of the cold trap 90 in the high vacuum line and the molecular sieve cold trap in the roughing pump line provides maximum protection against invasion of the vacuum working space by the backstreaming of particles from both of the pumps, and thus presents a barrier to molecular particle movement from both the oil diffusion pump 23 and the roughing pump 22.

In the use of any of the cold traps described and shown herein, a minimum of backstreaming of vapors, both from the roughing and oil diffusion pumps, and any other sources within the system, occurs due to the essentially complete optical blocking of the flow passages into the actual working space within the vacuum system, such as in the bell jar shown in FIGS. 1 and 2. It will be recognized that the cold traps are basically of the solid state type and additionally heat removal may be accelerated in the traps 90 and 91 by the flow of a form of heat transfer fluid which may or may not be a cryogenic fluid. Thus, efficient operations may be carried on without the necessity of maintaining on hand a supply of fluids such as liquid nitrogen.

What is claimed and desired to be secured by Letters Patent is:

1. A cold trap for blocking vapor particles from a working space of a vacuum system including pumping means for reducing the pressure within said system, said cold trap comprising: a heat sink base supported around a pumping conduit leading to said working space from said pumping means; heat sink column means supported on said heat sink base; thermoelectric means supported on said heat sink column means, said thermoelectric means having a hot junction coupled with said heat sink column and a cold junction defining a top supporting surface on said means; a baffle assembly supported on said cold junction of said thermoelectric means, said baffle assembly having a top cap plate portion supported on said cold junction surface and dependent baffle portions extending downwardly into a flow passage from said pumping conduit and defined by said heat sink base, said baffle assembly providing an optically dense structure permitting fluid flow between said pumping conduit and said vacuum space while precluding straight line movement of vapor particles from said pumping conduit into said vacuum space; and conductor means connected with said thermoelectric means for energizing said devices for cooling said cold junctions in response to current flow in a first direction and heating said cold junctions in response to current flow in an opposite direction.

2. A cold trap in accordance with claim 1 wherein said baffle assembly comprises a cap having a top plate portion and downwardly turned side flange portion and inverted interconnected U-shaped baffle plates extending downwardly through said heat sink base toward said pumping conduit.

3. A cold trap for use in a vacuum system between a vacuum working space and a mechanical roughing pump comprising: a housing in a pumping line between said roughing pump and said vacuum working space, said housing being hollow for flow therethrough between portions of said pumping line on opposite sides of said housing; a baffle assembly supported in said housing; a thermoelectric device having hot and cold junctions coupled with said baffle assembly, said cold junction of said device being connected with said baffle assembly for cooling said assembly responsive to current flow through said device; heat dissipation means connected with said hot junction of said device for dissipation of heat from said baffle assembly; porous means supported within said housing spaced from and defining a flow space with an inner wall therein around said baffle assembly; molecular sieve pellets supported in said porous means around said baffle assembly whereby said pellets are cooled responsive to cooling of said baffle assembly; and conductor means connected with said thermoelectric device for energizing said thermoelectric device.

4. Apparatus in accordance with claim 3 including means for flowing a heat absorbing fluid along said heat dissipation means.

5. Apparatus in accordance with claim 3 wherein said housing comprises a cylindrical hollow body providing a chamber communicating with pumping line portions on opposite sides of said housing, said porous means comprising a cylindrical member supported concentrically within said housing spaced apart from the inner wall thereof, and including removable enclosure plugs at opposite ends of said housing for access to said baffle assembly and said molecular sieve pellets within said porous member.

6. Apparatus in accordance with claim 5 wherein said thermoelectric device is secured to one of said closure caps having a hollow chamber therein along said heat dissipation means and including conduits connected through said closure cap communicating with said chamber for flowing heat absorbing fluid through said chamber.

7. Apparatus in accordance with claim 3 wherein said porous means comprises a cylindrical hollow member supported with a longitudinal axis thereof aligned substantially normal to the direction of flow through said housing and said baffle assembly comprises a plurality of elongated baffles arranged on a longitudinal axis aligned substantially along the longitudinal axis of said cylindrical hollow member.

* * * * *